Sept. 12, 1961 R. A. KNAPP 2,999,270
EXTRUSION PACKAGING APPARATUS
Filed Sept. 29, 1958 3 Sheets-Sheet 3

INVENTOR
Robert A. Knapp

United States Patent Office 2,999,270
Patented Sept. 12, 1961

2,999,270
EXTRUSION PACKAGING APPARATUS
Robert A. Knapp, Columbus, Ohio, assignor to Industrial Nucleonics Corporation, a corporation of Ohio
Filed Sept. 29, 1958, Ser. No. 763,949
14 Claims. (Cl. 17—35)

This invention relates to the manufacture of a product such as a food product which is packaged by extrusion, and more specifically it relates to a method and apparatus for maintaining weight uniformity of the packaged product.

The invention will be described in conjunction with a process wherein a food product is packaged by extrusion into a membranous casing, as is exemplified by the manufacture of sausage. Such a packaging method is often employed in the manufacture of a variety of meat and dairy products, including wieners, bologna, chili con carne, salami, sandwich meat and cheese. It is to be understood, however, that the method of this invention is equally applicable to many types of extrusion packaging which do not employ a membranous casing and which may or may not employed another type of casing, the necessary modifications of the herein disclosed apparatus in such a case being readily apparent to those skilled in the art.

Sausage is one of the oldest forms of processed food and, in general, is made from comminuted meat, usually combinations of beef and pork. According to the conventional procedure for manufacturing sausage, selected beef and pork trimmings are hashed separately and cured. The meat is then put into a cutter and comminuted. The chopped meat is next delivered to a stuffer, wherefrom the meat is extruded under pressure through a hollow, open-ended spindle or stuffing horn which carries the tubular membranous casing on the outside thereof. At this point the meat leaves the stuffing machine per se and enters the casing.

In recent years techniques have been developed whereby a tubular casing may be formed continuously from a flat strip of sheet material simultaneously with the stuffing thereof, making it unnecessary to shut down the stuffer at recurrent short intervals in order to reload the machine with a length of casing which had to be manually slipped over the delivery end of the stuffing horn. Consequently, modern sausage stuffers may operate continuously and at relatively high speeds.

Commonly the stuffed casing is subsequently formed into connected links, for example, by a machine such as is described in U.S. Patent No. 2,776,449, issued January 8, 1957, to Lawrence P. Cross.

While conventional sausage making machinery is capable of producing sausage links of substantially uniform length and diameter, variations in meat density have been found with a resultant variation in the weight of individual links. Since sausages are frequently sold in transparent packages containing a fixed number of sausages, the disadvantage in this weight variation will be obvious. Certain minimum weight requirements per package must be adhered to, which means that some type of weight control must be set up either as a part of the packaging operation or prior thereto. That is to say, the sausage making machine can be set so that the mean low weight sausages will exceed the minimum amount necessary to produce full weight packages. As an alternative to this, the individual sausage links coming from the sausage making machine can be weighed and under-weight sausages rejected and recased. A further method of assuring full weight packages is to weigh the sausages to be included in a given package and to balance low weight sausages with high weight sausages. All of these methods of maintaining full package weight necessitate additional labor and some result in the mean weight of the packages exceeding the minimum package weight by excessive amounts, with obvious economic loss.

According to the present invention it has now been found that the weight of sausage per unit length, and consequently, when in a linking process of individual sausage links, can be accurately controlled with only a slight modification of conventional sausage making machinery. In order to accomplish this the sausage meat is prepared according to the conventional process and is forced out of the stuffing horn. In a preferred embodiment of this invention, a gauge employing a source of penetrative radiation and a radiation detector are provided to sense the weight per unit length of the unlinked sausage after it leaves the stuffer. The radiation source and detector are preferably disposed on diametrically opposite sides of the path of travel of the sausage, and the detector provides a signal indicative of the actual weight per unit length of the meat-filled casing.

Between the source/detector and the horn, and contiguous to the end of the horn, there is placed a ring having an automatically controlled variable diameter aperture which encircles the casing as it is pulled from the horn. The inside diameter of the ring engages the outer surface of the casing and determines the ultimate diameter of the sausage being formed. When the weight per unit length sensed by the radiation gauge is higher than the nominal standard, the diameter of the ring is decreased so as to decrease the diameter of the sausage.

Since the length of the links is held constant by the conventional linking machinery, this control of sausage diameter provides a control of the weight of individual sausage links. Thus, when the inside diameter of the ring decreases in response to an increase is meat density as detected by the gauge, the diameter of the sausage is decreased and the weight per unit length falls accordingly. If the gauge indicates that meat density is low, the diameter of the opening in the ring is increased, thereby increasing the sausage diameter to maintain the weight per unit length constant despite density changes or other variable factors.

It is well-known that the absorption of penetrative radiation by a given material is a function of both the density and amount of material in the path of the beam of radiation. Therefore the radiation detector provides a signal which is indicative of both density and amount of material and this signal is used to control the diameter of the ring to maintain the weight of material passing the sensing unit constant. This method of control is capable of achieving a close regulation of product uniformity which guarantees that each package will meet the legal minimum weight requirements while effecting appreciable savings in labor and material costs.

It is an object of this invention to provide an extrusion packaging machine whereby weight variations in the packaged product are substantially eliminated.

It is also an object to provide a method and means of regulating an extrusion packaging process so as to maintain the delivered weight of the product constant at the desired value.

It is another object to provide an accurate, continuous and automatic gauging device capable of instantaneously indicating the weight unit length or density of material issuing from an extrusion packaging machine.

It is a further object to provide an apparatus for regulating the weight per unit length of a continuous flow of material from an extrusion apparatus by continuous and automatic adjustment of the cross-sectional area of said material flow in accordance with changes in the density thereof.

It is again an object to provide an improved sausage manufacturing apparatus having an automatic control for reducing the weight variation in individual sausage links.

It is an additional object of the invention to provide improved sausage manufacturing apparatus having a radiation gauge control device for minimizing weight variation in the sausages produced, which is simple in construction and readily adaptable to present packaging machines.

These and further objects and advantages of the invention will become apparent upon reference to the following specification and appended drawings wherein.

Figure 1:
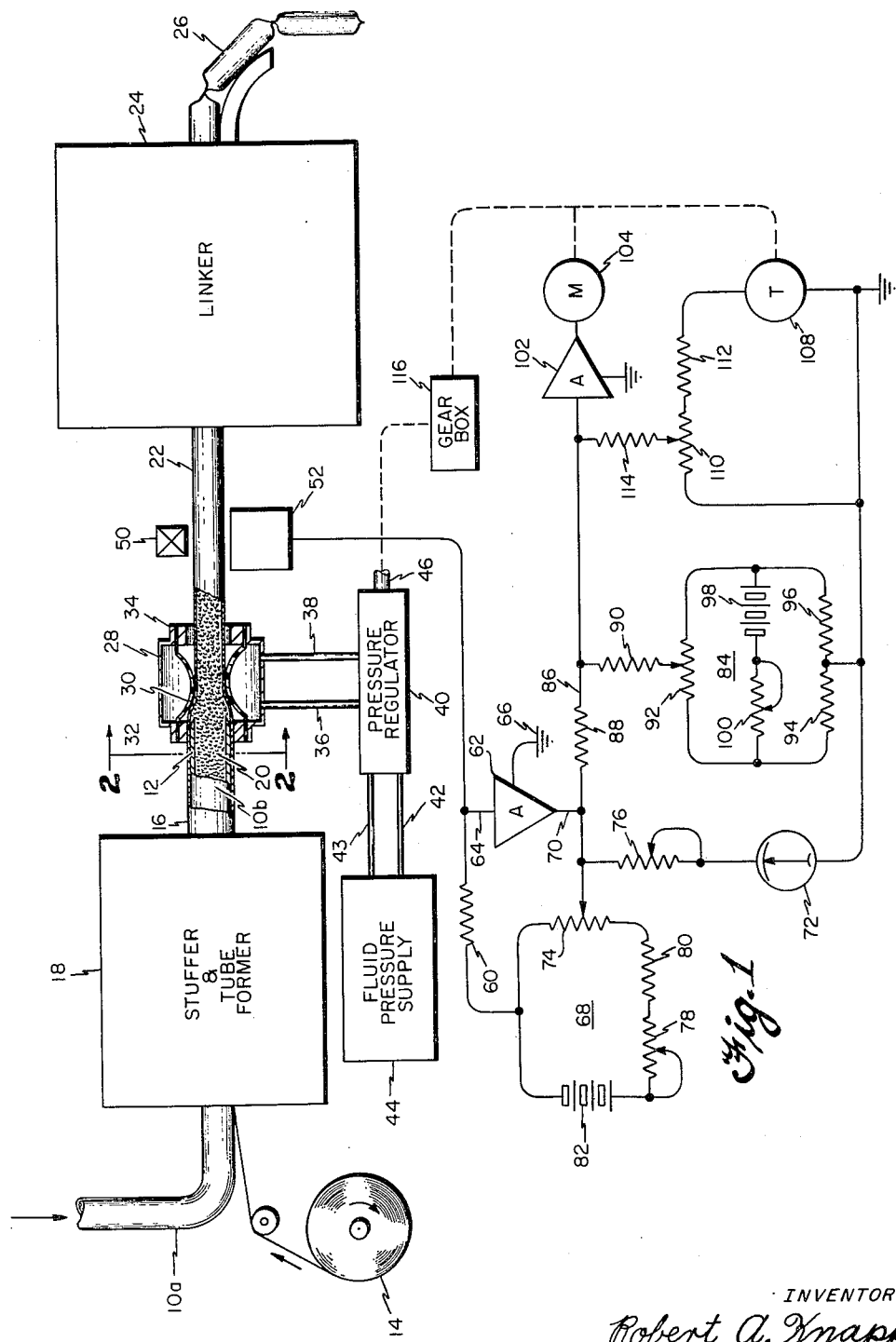
FIGURE 1 is a partially diagrammatic side elevation, partly in section, showing a portion of a sausage manufacturing machine and associated control apparatus constructed according to one preferred embodiment of the invention.

Referring to FIGURE 1, there is shown a portion of a stuffing and tube forming apparatus which may be of the type disclosed in U.S. Patent No. 2,607,696, issued August 19, 1952, to Walter B. Kunz, to which reference may be made for a more detailed description than that given herein. The apparatus comprises a generally integral feed pipe 10a and 10b through which comminuted meat flows under pressure and which forms a passage therefor terminating in a stuffing horn 12 shown partly in section. At 14 is a reel of membranous casing material which may comprise a roll of hydrophilic cellulosic strip which is formed into a seamed tube 16 surrounding the pipe 10b by the apparatus 18 in the manner described in the reference cited above. The meat 20 issuing from stuffing horn 12 is thereafter contained by the formed membranous casing 16 so as to form a sausage tube 22 which may then be passed to a linking machine 24 such as is described in the above-mentioned patent to L. P. Cross, wherefrom the sausage is delivered in the form of links as at 26.

Immediately adjacent the end of horn 12 there is provided a hollow annulus or ring 28 which is open on the inside. A resilient annular diaphragm 30 engages a pair of flanges 32 and 34 to close the ring and is sealingly secured thereto. A pair of conduits 36 and 38 communicate with the ring to provide a means for controlling the pressure of a fluid therein.

It will be apparent that when the pressure in ring 28 is increased the diaphragm is distended to reduce the diameter of the casing and sausage as it leaves the end of horn 12. The greater the distention of diaphragm 30, the smaller the diameter of sausage tube 22. The annulus and diaphragm thus comprise a ring having a variable inner diameter which is controlled by the pressure in the ring.

A suitable means for controlling the pressure in ring 28 comprises an automatic pressure regulating device 40 connected by means of pressure line 42 and return pipe 43 to a suitable source of fluid pressure 44. The pressure to be maintained in the chamber of the ring 28 is variable by means of the control shaft 46 which sets the control point of the pressure regulator 40. In accordance with the regulator setting, additional fluid may be forced into the ring 28 through conduit 36 to increase the pressure in the ring, or fluid may be released through conduit 38 to decrease the pressure in the ring.

The adjustment of regulator 40 is effected by the automatic control mechanism in accordance with the measurement provided by the radiation gauge, which includes a source 50, detector 52, resistor 60, a feedback amplifier 62, a calibrating and standardizing network 68 and an indicating device 72.

The controller comprises a comparator network 84 and an integrating velocity servo system 102–114, including a gear reducer 116 through which the servo motor 104 may effect the adjustment of the regulator 40.

The radiation source 50 may be any suitable source of penetrative radiation such as X-rays, beta rays or gamma rays. In most cases, the weight of the extruded material is beyond the penetrating range of beta rays. For this reason, soft X-rays or gamma rays will be most frequently utilized. For convenience, continuing accuracy and economy, the radiation source to be provided is a relatively long-lived radioisotope, and a gamma ray emitter such as cesium-137 is satisfactory in many applications.

The detector 52 may comprise an ionization chamber, Geiger-Müller tube, scintillation counter or crystal detector, although the ionization chamber is preferred for this type of measurement.

The source 50 is preferably mounted on one side of the path of sausage tube 22 while the detector 52 is mounted on the other side. The radiation absorption by the sausage tube 22 is dependent on the weight per unit length thereof. The radiation received by the detector and the resulting output of the same is therefore an inverse function of the said weight per unit length.

The electrical output signal developed by the detector is a minute current which flows through a resistor 60 having a very high impedance. A voltage proportional to current through the detector 52 is thereby developed across resistor 60, and this signal is utilized by the measuring system of the gauge to provide an indication of the weight per unit length of the sausage 22 between the source 50 and the detector 52.

The measuring system comprises a feedback amplifier 62 with an input on line 64 and ground reference 66; a calibrating and standardizing network indicated generally at 68, and the weight indicator 72. In operation the signal voltage developed across resistor 60 is compared with a fixed voltage from the network 68, this latter voltage always being subtracted algebraically from the signal voltage so that the amplifier responds to the difference. The output of the amplifier on line 70 is coupled back to the input 64 through the network 68 and resistor 60, so as to maintain the amplifier input at substantially zero or ground potential at all times. Thus the amplifier output voltage between line 70 and ground is automatically maintained equal to the algebraic difference between the voltage developed across resistor 60 and the fixed voltage from the network 68. The amplifier therefore performs an impedance matching function in transforming a high impedance signal into a robust signal for operating the controller and the indicating meter 72, and this is accomplished without appreciable distortion of the signal, through the agency of the substantially total inverse feedback arrangement. The indicator 72 is responsive to any output voltage from the amplifier 62, and its pointer will be deflected to either side of its zero center position depending on the polarity of this output.

It can be seen that the calibrating potentiometer 74 provides an adjustment whereby the zero center position of the indicator 72 can be made to correspond to any selected value of sausage weight per unit length which it is desired to place at the center of the scale associated with the indicator. Potentiometer 76 is provided to allow an adjustment of the span of weight deviations on each side of the center value which are readable on the indicator scale. Thus the indicator scale may be calibrated directly in any desired units of weight per unit length.

Potentiometer 78 and resistor 80 determine the portion of the voltage from the voltage source 82 which is available across potentiometer 74 to provide the opposing voltage in the measuring system. Potentiometer 78 is therefore the means of standardizing the gauge so that the total voltage available across potentiometer 74 may be restored at any time to the exact value of the maximum voltage across resistor 60 when no material is interposed between the source 50 and the detector 52.

The measuring system briefly described above is the subject of a copending application Serial No. 628,999, filed December 18, 1956, by Sidney A. Radley, now Patent No. 2,965,847, and accordingly the full details thereof are not included in this specification.

The voltage output of the amplifier 62 which appears on line 70 is indicative of the weight of sausage passing between the source 50 and the detector 52. This signal, which energizes the weight indicator 72, also provides the input to the automatic controller. The network 84 provides a voltage signal representative of the desired weight per unit length of sausage. This voltage is continuously subtracted from the voltage signal representing the measured weight of the sausage, so that the difference voltage appearing on line 86 at the junction of resistors 88 and 90 is a signal representing the direction and magnitude of the error in the measured weight of the sausage.

The selected weight of the sausage which is desired to be maintained constant by the automatic controller may be preset by means of potentiometer 92 in the network 84; that is, the setting of this potentiometer determines the direction and magnitude of the comparison voltage representing the desired weight. The bridge circuit 84, comprising potentiometer 92 and a pair of identical precision resistors 94 and 96, is energized by a voltage source represented by the battery 98. The voltage available across the bridge is adjustable by means of potentiometer 100. The potentiometer 92 may therefore be equipped with a graduated dial and calibrated directly in any desired units of weight per length to agree with the scale of the weight indicator 72. This provides a direct reading indication of the setting of the control point, independent of the calibration of the weight indicator 72.

The error signal appearing on line 86 provides an input voltage to the servo amplifier 102 which energizes the servo motor 104. The motor 104 drives the control shaft 46 of the pressure regulator 40 through reduction gears 116. The servo motor 104 also drives a tachometer generator 108 which develops a D.C. voltage having a polarity in accordance with its direction of rotation and a magnitude proportional to its speed. The tachometer output voltage appears across the voltage divider network of potentiometer 110 and resistor 112. Depending on the setting of potentiometer 110, a portion of the tachometer voltage is fed back through resistor 114 to the input of the servo amplifier 102 in opposition to the error signal voltage.

The servo amplifier 102 is designed to have an almost infinite forward gain so as to saturate on a very small input signal. If the input voltage representing an error in measured sausage weight has a certain polarity, the servo motor 104 will be driven with full acceleration in one direction. If the error voltage has the opposite polarity, the motor will accelerate in the opposite direction. The motor will continue to accelerate until the voltage derived from the tachometer becomes equal and opposite to the error signal, at which time the input to the servo amplifier on line 86 is reduced to zero. At any greater speed the tachometer output through resistor 114 would become larger than the error signal, so that the input to the servo amplifier 102 would have the opposite polarity, tending to energize the servo motor 104 to drive in the opposite direction. It can be seen that by this means the speed of the servo motor 104 and the rate or readjustment of the pressure regulator setting is maintained instantaneously proportional to the magnitude and direction of the error in the measured weight of the sausage. Therefore, over any given period of time, the total amount of adjustment applied to the control shaft 46 is proportional to the time integral of the error signal received over the same period of time.

The rate of correction to the control shaft 46 per unit of error in measured sausage weight is referred to as the "gain" of the control system. The maximum available gain of the system is dependent on the ratio selected for the speed reduction gears 116. The gain is variable over a suitable range by adjusting potentiometer 110, which determines the portion of the tachometer voltage which is fed back to cancel the error signal. Potentiometer 110 therefore determines the speed of the servo motor 104 which will be maintained for a given amount of error in sausage weight.

The maximum permissible gain of the control system is definitely limited by transportation lag; that is, the length of time required for the effect of a step change in the setting of shaft 46 to be observed as a change in weight of the sausage passing between the source 50 and the detector 52. If the gain is set too high, an existing error will be over-corrected before the gauge is able to "see" that sufficient correction has already been applied. Hence the stuffing process is caused to "cycle" or perform forced oscillations around the desired sausage weight. On the other hand, it is desirable to keep the gain as high as possible to secure optimum performance from the controller. Obviously, it is desirable to locate the source detector as close to the diameter-controlling ring 28 as possible.

The control system briefly described above is the subject of a co-pending application Serial No. 641,414, filed February 20, 1957, by Philip Spergel and Sidney A. Radley, now Patent No. 2,955,206, and accordingly the full details thereof are not included in this specification.

Figure 2:
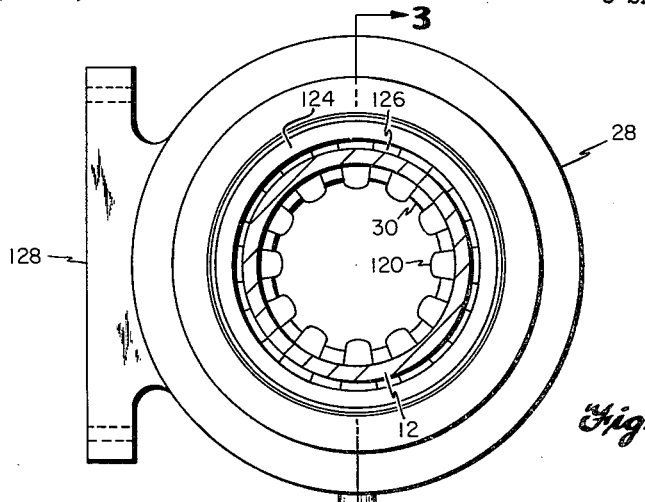
FIGURE 2 is an enlarged sectional view taken on the line 2—2 of FIG. 1 showing the end view of the diameter control unit in FIG. 1.
Figure 3:
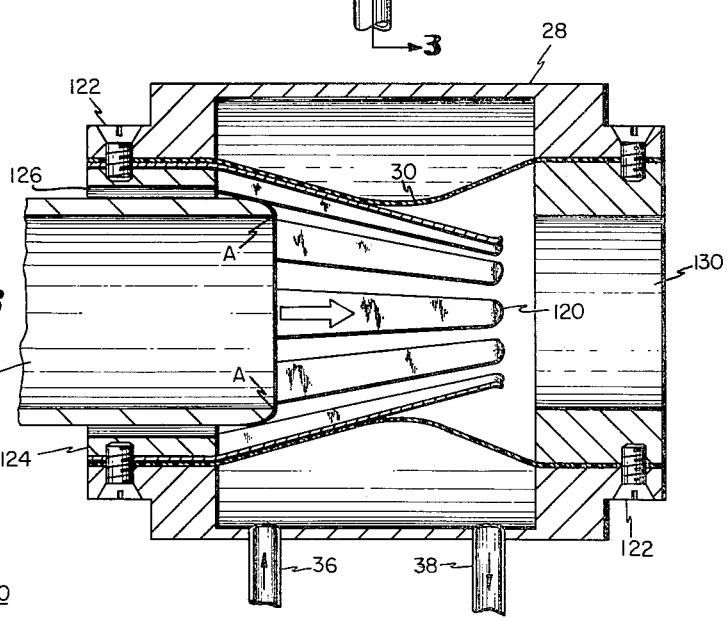
FIGURE 3 is a section on the line 3—3 of FIG. 2.

With reference now to FIGS. 2 and 3 the diameter control arrangement generally shown in FIG. 1 is sufficiently enlarged to clearly illustrate its mechanical construction. For purposes of clarity, the casing 16 and meat material 20 are omitted. A ring of stainless steel fingers as at 120 is enclosed by the concentrically arranged flexible diaphragm 30 both of which are secured by a plurality of bolts as at 122 between the hollow annulus 28 and an inner ring 124. The outside diameter of stuffing horn 12 is slightly less than the inside diameter of the inner ring 124 so that a space 126 is provided about the stuffing horn 12 for the passage thereover of casing 16. Secured to the annular housing 28 is a mounting bracket 128 which serves to maintain the position of the diameter control mechanism over the stuffing horn 12.

The coaction of the fingers 120 and the diaphragm 30 may be more easily understood by referring to FIG. 3. The admission of fluid through the inlet pipe 36 causes the expansion of diaphragm 30. A distention of diaphragm 30 causes each finger as at 120 to be inwardly deflected an equal amount against the inherent spring tension of the finger, which tension contributes to the re-expansion of the control aperture when the fluid pressure is reduced in the chamber. A sausage outlet pipe of sufficient internal diameter to accommodate the largest product to be processed is formed by a second inner ring 130, similar to ring 124 and similarly mounted to retain the other end of diaphragm 30.

In operation, the mounting bracket 128 is rigidly affixed to a convenient stationary support so that the diameter control mechanism is concentrically arranged with respect to the stuffing horn 12. The comminuted meat 20 is forced through the stuffing horn 12 and the casing 16 is carried over the external surface thereof. The linear velocity of the process is primarily determined by the speed of the linker 24. At point A, the meat contacts the interior of the casing 16 and is contained therein. As the sausage 22 leaves the stuffing horn 12 and proceeds in the direction indicated by the arrow, its diameter approximates that of the inside diameter of the horn 12. Shortly thereafter, a constriction of the sausage 22 results as the fingers as at 120 force the sausage 22 to assume the diameter determined by the distance between any two diametrically opposite fingers. The sausage 22 emerges from the outlet pipe 130 and is pulled through the gauging head comprising source 50 and detector 52 into the linking machine 24.

Figure 4:
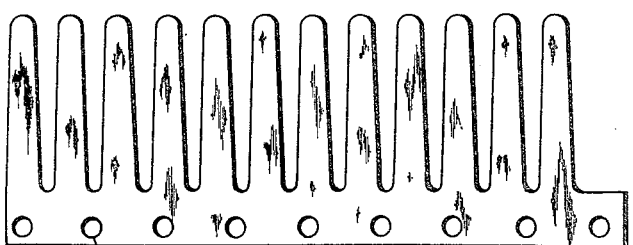
FIGURE 4 is a development of the aperture spring member.

FIG. 4 shows the development of the fingers 120 and is representative of one method of construction. The fingers may be stamped from a flat sheet of flexible stainless steel and ground so that each finger as at 120 is smooth. This insures that no sharp edges on the fingers will come in contact with the sausage 22. A plurality of holes as at 132 are drilled to receive the bolts as at 122 when the finger assembly is mounted in position.

The arrangement of the control apparatus illustrated in FIG. 1 will be recognized as what is referred to as a "closed loop" or true inverse feedback system of control, and produces superior results where the direct measurement of weight per unit length can be made with good accuracy.

However, certain extruded products are characterized by a semi-fluid consistency and variable viscosity such that at different times and under different conditions the extruded material exhibits different degrees or "slump" after being shaped by passing through the variable aperture device. In this instance the cross-sectional shape of the measured product as well as its weight per unit length is subject to change so that the accuracy of the measuring instrument suffers as a result of geometrical considerations.

Figure 5:
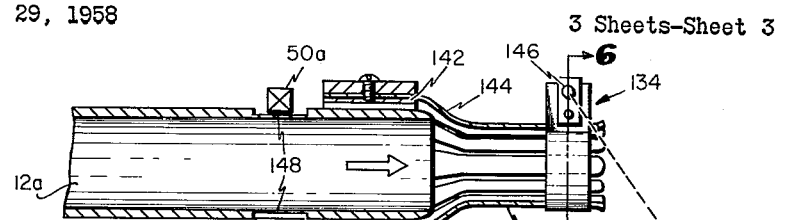
FIGURE 5 is a partially diagrammatic side elevation, partly in section, showing an alternative diameter control apparatus in accordance with another preferred embodiment of the invention.

In such cases it may be more desirable to effect the measurement while the material is confined to the constant cross-sectional dimension of the stuffing horn or feed pipe in the manner illustrated in FIG. 5. Herein a radiation source and detector 50a and 52a are located on opposite sides of a feed pipe 12a which is modified by a pair of diametrically opposite, milled thin walled portions 148 adjacent the source and detector which are provided to minimize the attenuation of the radiation beam by the pipe walls. By reducing the amount of radiation absorbed in the pipe, the device is made more sensitive to variations in the extruded material per se.

Again, as in the system of FIG. 1, an automatically controlled variable aperture device is to be used to regulate the diameter of the extruded material. However, it is apparent that in this case the measuring device is not responsive to the actual weight per unit length of the extruded material formed by the variable aperture device, but instead is responsive to the density of the material confined to a constant cross-sectional area of the feed pipe. Therefore, the system is not adapted to the closed loop system of control. Instead, the density measurement must be converted to an indication of a corresponding cross-sectional area of the extruded product such that the weight per unit length is corrected, and the diameter control adjusted accordingly. Thus it is a requirement that the controller receive information as to the existing diameter of the variable aperture, as well as measured density information.

The variable aperture system of FIGS. 1–4 is not well adapted to provide this diameter indication. Although the diameter of the aperture therein is a function of the amount of fluid pressure applied to the annular diaphragm 30, the pressure applied is dependent on the degree of flexibility of the diaphragm, the viscosity of the ground meat or other extruded material as determined by the constituents, the temperature, and other variables.

Figure 6:
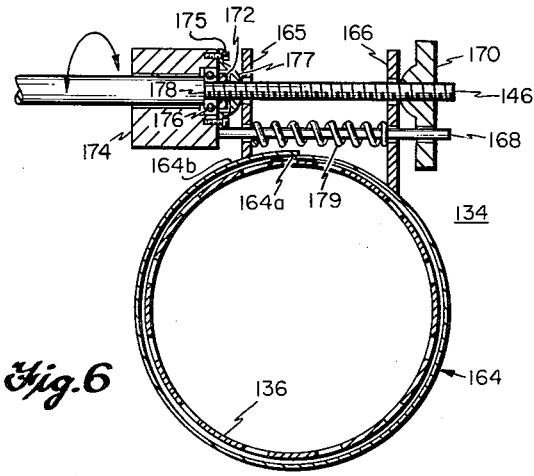
FIGURE 6 is an enlarged section on the line 6—6 of FIG. 5.

The variable aperture device shown in the modification of FIG. 5 and FIG. 6 is constructed so that the diameter of the material shaping aperture is positively and reproducibly dependent on, and correlated with, the setting of the control adjustment. The modified diameter control device comprises a ring of stainless steel fingers 136 circumvented by a clamp 134. The fingers 136 may generally resemble the fingers 120 described hereinabove in connection with FIG. 3 and FIG. 4. The fingers 136 may be individually bent as shown to produce a necked-down portion 144 and secured by screws as at 138 between annular rings 140 and 142. Rings 140 and 142 are supported concentrically about the discharge outlet of feed pipe 12a in noncontacting relationship therewith by means of a bracket (not shown) which may be similar to bracket 128 shown in FIG. 2.

It is seen that fingers 136 describe a funnel-shaped passage through which the sausage (not shown for clarity) is forced in the direction indicated by the large arrow. Clamp 134 carries a screw 146 adapted to vary the size of the exit of this passage by regulating the degree of compression or expansion of the fingers 136.

As shown in detail in FIG. 6, clamp 134 includes a thin stainless steel band 164 bent in a generally circular shape wherein a tapered tip 164a passes under an alternate end 164b. The band 164 engages the external surface of the fingers 136. Secured to the band 164 near its extremities are two upstanding legs 165 and 166 having holes bored therein to loosely accommodate a guide rod 168 and the clamp screw 146. The clamp screw 146 includes a threaded portion for accommodating a clamp nut 170 and a bearing lock nut 172. A mounting block 174 which may be bolted or otherwise secured to the stuffing machine serves to position the diameter control device with respect to the fingers 136. Block 174 contains a drilled hole for receiving the control screw 146, the hole being counterbored to receive a suitable thrust bearing 176. The thrust bearing 176 is held firmly against a shoulder 178 on the shaft of clamp screw 146 by the lock nut 172. Abutting the outer race of the thrust bearing 176 and bolted as at 175 to the mounting block 174 is a bearing retainer 177. The bearing retainer 177 is fabricated with a crowned surface which bears against the leg 165 to space the leg 165 from the mounting block 174. A similar crowned surface is formed on the surface of the clamp nut 170 to bear against the alternate leg 166. The guide rod 168 may be securely tapped into the mounting block 174, and carries a spring 179 tending to urge the legs 165 and 166 apart and in contact with the crowned surfaces of the bearing retainer 177 and the clamp nut 170.

In the operation of this device for varying the aperture diameter, rotation of the clamp screw 146 in one direction causes the leg 166 to approach the leg 165 as the nut 170 is drawn toward the mounting block 174 on the guide rod 168. The fingers 136 will be compressed and a reduced aperture will be defined by the fingers 136. Conversely, counter-rotation of the clamp screw 146 causes the nut 170 to release the pressure on the leg 166 so that the spring 179 may function to separate the legs 165 and 166. A variable aperture whose cross-sectional area is dependent upon the relative position of the clamp screw 146 is thus described by the fingers 136.

In FIG. 5 the radiation source 50a and detector 52a are preferably mounted upon the feed pipe 12a as close as practical to the diameter control device. Detector 52a accordingly transmits a signal indicative of the density of the meat being forced through the feed pipe 12a to a strip chart recorder 150. The recorder 150 includes a pen and pointer mechanism 154 serving to graphically record the variations in meat density as determined by the detector 52a in the manner described in U.S. Patent No. 2,790,945 issued April 30, 1957, to Henry R. Chope.

Recorder 150 further includes a target setting knob 152 mechanically coupled to a target density indicating pointer 153. Variations in meat density from the predetermined target produce an electrical voltage which is coupled to a controller 156 via line 155. The controller 156 drives a servo motor 158 connected to a gear box 160 through which mechanical power is applied to the clamp screw 146. In addition, the clamp screw 146 is mechanically connected as indicated by the dotted line 157 to the controller 156 so that the controller senses the relative angular position of said clamp screw.

Figure 7:
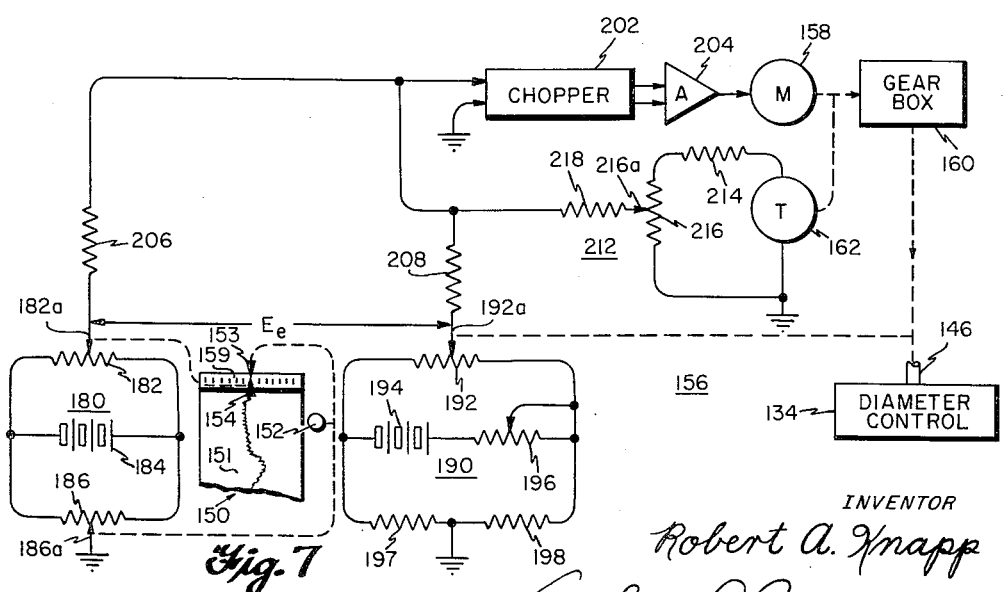
FIGURE 7 is a schematic diagram showing in more detail portions of the control system outlined in FIG. 5.

With reference now to FIG. 7, the open loop control system briefly described hereinabove is illustrated in greater detail to afford a more complete understanding of the same. Generally speaking, a recorder bridge network 180 and a controller bridge network 190 generate D.C. output voltages which are transmitted to a conventional chopping circuit at 202. The chopper 202 is responsive to the difference in the D.C. potentials of the networks 180 and 190 to produce an A.C. signal of a magnitude and phase in accordance with the magnitude and polarity of the D.C. input signal which is hereinafter referred to as the error signal $E_e$. Amplification of the output of chopper 202 occurs in the power amplifier 204. This amplified A.C. signal drives the servo motor 158 which is mechanically coupled to the gearing arrangement at 160. A tachometer generator 162 is also driven by the servo motor 158. Associated with said tachometer generator is a voltage dividing network 212 through which a portion of the tachometer voltage is fed back to the input of the chopper 202 in opposition to the error signal $E_e$.

The tachometer voltage divider includes a resistor 214 and a potentiometer 216 serially connected across the output of tachometer 162. A movable arm 216a selects a portion of the tachometer output potential and transmits the same to the chopper 202 through a summing resistor 218.

The recorder bridge 180 includes a slidewire potentiometer 182, a source of bridge potential 184 and a target potentiometer 186. The potentiometer 182 is a repeat slidewire which is mechanically coupled to the measuring indicator 154 of the strip chart recorder 150. Arm 186a of the target setting potentiometer 186 is mechanically coupled to the target indicator 153 which may be adjusted by the knob 152 to select a predetermined average value of sausage density which may be read on the density scale 159 of the recorder 150. As the arm 182a rides on the slidewire 182 in accordance with the actual measured density of meat in the pipe 12a, an electrical potential exists between the arm 182a and ground whenever the measured meat density deviates from the target value. This electrical voltage is applied to the chopper 202 through a summing resistor 206.

The bridge network 190 includes a potentiometer 192 having an arm 192a mechanically linked to the control shaft 146 of the clamp 134, a source of bridge potential at 194 in series with a span setting potentiometer 196 and a pair of serially connected precision resistors 197 and 198 whose common terminal is grounded.

It is apparent that the potential on arm 192a will be a function of the relative setting of the clamp screw 146, which in turn is proportional to the diameter of the sausages produced. The weight per unit length of the sausages, however, is proportional to the cross-sectional area thereof; that is, when the density remains constant the sausage weight is directly proportional to the square of the diameter. Similarly, when the diameter remains constant the weight per unit length is directly proportional to the density. Since there is a linear relationship between a meat density change and the corresponding voltage change at the arm 182a of potentiometer 180, there should also be a linear relationship between a change in the area enclosed by the clamp 134 and the corresponding voltage change at the arm 192a of potentiometer 192. Accordingly potentiometer 192 is wound as a squaring potentiometer providing a voltage at its tap 192a which varies as the square of the distance the tap is moved along the resistance element. The range of voltages available across potentiometer 192 is adjustable by means of potentiometer 196 so that the output of the bridge circuit 190 may be electrically matched with the output of the bridge circuit 180.

The voltage outputs of bridge circuits 180 and 190 are summed at the input of the chopper 202 through resistors 206 and 208. Whenever these two voltages are not equal, the chopper will deliver an input signal to the servo amplifier 204 which energizes the servo motor 158 to run in a direction such that the arm 192a of potentiometer 192 will seek a position wherein the voltage output of bridge 190 is equal and opposite to the voltage output of bridge 180. Thus a change in the density gauge reading automatically produces a change in the diameter of the clamp 134 such that the weight per unit area of the extruded sausage will be maintained substantially constant.

The tachometer feedback system in this case conveniently provides adjustable damping in the servo system so that the motor may be allowed to correct the diameter control setting at a maximum rate without sustaining undesirable oscillations in the control system. Since the tachometer 162 is driven by the servo motor 158, it develops a D.C. voltage having a polarity in accordance with the direction of motor rotation and an amplitude proportional to the speed thereof. This tachometer voltage appears across the voltage divider combination of resistor 214 and potentiometer 216, and the adjusted portion of the tachometer output appearing at the arm 216a, of potentiometer 216 is fed back to the input of the chopper 202 through summing resistor 218 in opposition to the voltage from the network 180. Accordingly, in the manner hereinabove described in connection with FIG. 1, the servo motor speed during readjustment of the diameter control is limited to a value proportional to the magnitude of the error signal $E_e$.

In the operation of the above described embodiment of the present invention, it is assumed that meat material of the predetermined target density is being processed and that the clamp screw 146 is adjusted so that the individual sausages are of the desired weight. The coupling of the clamp screw 146 to the potentiometer 192 positions the arm 192a so that the potential thereon is zero with respect to ground. Since the density is "on target" the potential on the arm 182a is also zero which means that the error voltage $E_e$ will likewise be substantially zero.

Presuming that the meat being processed suddenly increases in fatty material, an error signal $E_e$ is applied to the controller 156 due to the decrease in density as detected by the source 50a and detector 52a. Recorder 150 registers the change in density as the measuring pen 154 starts tracing to one side of the target line. The chopper 202 and amplifier 204 directs the servo motor 158 to rotate in a direction so as to increase the diameter of the control aperture. The potentiometer arm 192a is forced to travel in a direction so as to make the potential appearing thereon equal and opposite to that existing upon arm 182a. The motor speed increases until the tachometer 162 and associated divider 212 applies a potential at the chopper input equivalent to the error voltage $E_e$. This tends to limit the rotational velocity of the servo motor 158 until the potentials appearing at the potentiometer arms 182a and 192a have been equalized. The error signal $E_e$ approaches zero and the servo motor 158 ceases to operate, at which time the control aperture has been efficiently enlarged. Conversely, it follows that an increase in density of the meat material will oppositely affect the controller 156 to constrict the aperture.

Hence, the links of less dense sausage will have a larger diameter than those of more dense sausage, but the weight of each link will remain a constant desired value. Inasmuch as the density of the meat is one indication of the quality thereof, provision may be made for the recorder scale 159 to be suitably labeled as an aid to operating personnel in determining the grade of sausage being produced.

Having described above the principles of the present invention in connection with specific embodiments, it should be realized that the description should be considered exemplary only and not as a limitation of the invention since numerous changes, omissions and additions may be made to the disclosed apparatus and outwardly quite different embodiments may be constructed without departing from the spirit and scope of the present invention as is set forth in the appended claims.

What is claimed and desired to be secured by the United States Letter Patent is:

1. An apparatus for producing sausages comprising a hollow tube through which sausage meat is extruded into a sausage casing mounted on said tube and being drawn thereoff by meat extruded from said tube to form a sausage, means for controlling the diameter of said sausage, a radiation source and detector mounted adjacent said diameter controlling means, and control means controlled by said detector and varying said diameter controlling means to maintain the weight per unit length of said sausage substantially constant.

2. An apparatus for producing sausages comprising a hollow tube through which sausage meat is extruded into a sausage casing mounted on said tube and being drawn thereoff by meat extruded from said tube to form a sausage, means for controlling the diameter of said sausage mounted at the end of said tube, a radiation source and detector mounted adjacent said diameter controlling means and providing a signal which is at least a partial function of the density of sausage meat passing by said detector, and means controlled by said signal for actuating said diameter control means to maintain the weight per unit length of said sausage substantially constant.

3. An apparatus for producing sausages comprising a hollow tube through which sausage meat is extruded into a sausage casing mounted on said tube and being drawn thereoff by meat extruded from said tube to form a sausage, means for controlling the diameter of said sausage mounted at the end of said tube, a radiation source and detector mounted adjacent said diameter controlling means and providing a signal which is at least a partial function of the density of sausage meat passing by said detector, said source being mounted on one side of the axis of said tube and said detector being mounted on the other side thereof so that radiation reaching said detector from said source must pass through the sausage meat, and means controlled by said signal for actuating said diameter control means to maintain the weight per unit length of said sausage substantially constant.

4. An apparatus as set out in claim 3 wherein said diameter control means comprises ring means having an aperture therethrough of variable diameter, said sausage passing through said aperture.

5. An apparatus as set out in claim 4 including a variable source of fluid pressure, wherein said ring means comprises a flexible member having said fluid pressure applied to one side thereof, and wherein said actuating means for said diameter control means includes means for adjusting said fluid pressure from said source thereof.

6. An apparatus for producing sausages comprising a hollow tube through which sausage meat is extruded into a sausage casing mounted on said tube and being drawn thereoff by meat extruded from said tube to form a sausage, means for controlling the diameter of said sausage mounted at the end of said tube, a radiation source and detector mounted adjacent said diameter controlling means so that the radiation reaching said detector from said source passes through said tube, said detector providing a signal indicative of the density of the sausage meat in said tube, and means controlled by said signal for actuating said diameter control means to maintain the weight per unit length of said sausage substantially constant.

7. An apparatus for producing sausages comprising a hollow tube through which sausage meat is extruded into a sausage casing mounted on said tube and being drawn thereoff by meat extruded from said tube to form a sausage, means for controlling the diameter of said sausage mounted at the end of said tube, a radiation source and detector mounted adjacent said diameter controlling means past the end of said tube so that the radiation reaching said detector from said source passes through said casing and meat but not through said tube, said detector providing a signal indicative of the weight per unit length of sausage passing thereby, and means controlled by said signal for actuating said diameter control means to maintain the weight per unit length of said sausage substantially constant.

8. Extrusion packaging apparatus comprising a hollow tube through which a product is extruded, means defining a variable diameter aperture forming the outlet of said tube for determining the diameter of the extruded length of said product, a radiation source mounted on one side of said tube for directing a beam of penetrative radiation through said tube and said product contained therein, means including a radiation detector mounted on the opposite side of said tube and detecting radiation transmitted by said tube and the contents thereof to provide an electrical signal which is functional of the density of said product passing through said tube, means for adjusting the diameter of said variable aperture defining means and motor means controlled by said signal for varying said diameter adjusting means so as to maintain the weight per unit length of said extruded product substantially constant.

9. An apparatus as set out in claim 8 wherein said tube outlet comprises a flexible, cylindrical barrier encompassing said aperture, and wherein said adjusting means comprises clamp means circumventing said barrier to effect a variable constriction thereof.

10. Extrusion packaging apparatus comprising a hollow tube through which a product is extruded, means defining a variable diameter aperture forming the outlet of said tube for determining the diameter of the extruded length of said product, a radiation source mounted on one side of said tube for directing a beam of penetrative radiation through said tube and said product contained therein, means including a radiation detector mounted on the opposite side of said tube and detecting radiation transmitted by said tube and the contents thereof to provide an electrical signal which is functional of the density of said product passing through said tube, means for adjusting the diameter of said variable aperture defining means, means connected to said diameter adjusting means for generating an electrical signal which is functional of the area of said aperture, means for combining said density and area functional signals, and motor means controlled by said combined signals for varying said diameter adjusting means so as to maintain the weight per unit length of said extruded product substantially constant.

11. Extrusion packaging apparatus comprising a hollow tube through which a product is extruded, means defining a variable diameter aperture terminating said tube for determining the diameter of the extruded length of said product, a radiation source mounted on one side of said extruded product for directing a beam of penetrative radiation therethrough, means including a radiation detector mounted on the opposite side of said extruded product and detecting radiation transmitted thereby to provide an electrical signal which is functional of the weight per unit length of said extruded product and means controlled by said signal for adjusting said variable aperture defining means to maintain said weight per unit length substantially constant.

12. An apparatus as set out in claim 11 wherein said diameter control means comprises ring means having an aperture therethrough of variable diameter, said sausage passing through said aperture.

13. An apparatus as set out in claim 12 including a variable source of fluid pressure, wherein said ring means comprises a flexible member having said fluid pressure applied to one side thereof, and wherein said actuating means for said diameter control means includes means for adjusting said fluid pressure from said source thereof.

14. An apparatus as set out in claim 11 wherein said tube outlet comprises a flexible, cylindrical barrier encompassing said aperture, and wherein said adjusting means comprises clamp means circumventing said barrier to effect a variable constriction thereof.

References Cited in the file of this patent

UNITED STATES PATENTS

| | | |
|---|---|---|
| 1,395,967 | Merli et al. | Nov. 1, 1921 |
| 2,687,052 | Zeitlin | Aug. 24, 1954 |
| 2,737,186 | Molins et al. | Mar. 6, 1956 |
| 2,790,945 | Chope | Apr. 30, 1957 |
| 2,831,980 | Howell | Apr. 22, 1958 |
| 2,871,508 | Hill | Feb. 3, 1959 |